(12) United States Patent
Lewis (10) Patent No.: US 7,778,861 B2
(45) Date of Patent: Aug. 17, 2010

(54) METHODS AND SYSTEMS TO COMPLETE TRANSACTION DATE

(75) Inventor: Donald C. Lewis, Bell Buckle, TN (US)

(73) Assignee: Aspect Software, Inc., Lombard, IL (US)

( * ) Notice: Subject to any disclaimer, the term of this patent is extended or adjusted under 35 U.S.C. 154(b) by 1207 days.

(21) Appl. No.: 11/209,568

(22) Filed: Aug. 22, 2005

(65) Prior Publication Data

US 2007/0043542 A1    Feb. 22, 2007

(51) Int. Cl.
*G06F 9/46* (2006.01)

(52) U.S. Cl. .................................. 705/9; 705/7; 705/8

(58) Field of Classification Search .................... None
See application file for complete search history.

(56) References Cited

U.S. PATENT DOCUMENTS

| | | | |
|---|---|---|---|
| 4,931,951 A * | 6/1990 | Murai et al. ................ | 706/61 |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,330,483 B1 * | 12/2001 | Dailey ......................... | 700/28 |
| 6,345,305 B1 | 2/2002 | Beck et al. | |
| 6,373,836 B1 | 4/2002 | Deryugin et al. | |

(Continued)

OTHER PUBLICATIONS

Hansen, Peter Reinhard; Lunde, Asger; Nason, James M. Federal Reserve Bank of Atlanta, Working Paper Series, 2005, 7, NA Mar. 28, 2005.*

(Continued)

*Primary Examiner*—Romain Jeanty
*Assistant Examiner*—Brett Feeney
(74) *Attorney, Agent, or Firm*—Husch Blackwell Sanders Welsh Katz (57) ABSTRACT

A method and system to receive transaction data; determine a gap in the transaction data; and use an algorithm to generate data to fill in the gap is described. The algorithm is selected from a group including a first algorithm and a second algorithm. The first algorithm is to determine a dominant pattern in the transaction data; identify a region within the dominant pattern that corresponds to the gap in the transaction data; and adopt data associated with the corresponding region into the gap to minimize impact on the dominant pattern. The second algorithm includes a Moore-Penrose pseudo-inverse algorithm to choose the transaction data to fill in the gap based on a set of substitute data from among a group of substitute data sets and adopts the set of substitute data into the gap.

10 Claims, 4 Drawing Sheets

U.S. PATENT DOCUMENTS

| | | | |
|---|---|---|---|
| 6,389,007 | B1 | 5/2002 | Shenkman et al. |
| 6,393,015 | B1 | 5/2002 | Shtivelman |
| 6,732,156 | B2 | 5/2004 | Miloslavsky |
| 6,956,815 | B2 * | 10/2005 | Chiodini ..................... 370/210 |
| 2003/0200097 | A1 * | 10/2003 | Brand ........................ 704/500 |
| 2005/0050072 | A1 * | 3/2005 | Widdup et al. .............. 707/100 |

OTHER PUBLICATIONS

Jacroux, Mike; Majumdar, Dibyen; Shah, Kirti R. Journal of the American Statistical Association, v92, n437, p. 375(8) Mar. 1997.*

Greville, T. N., "Some applications of the pseudoinverse of the matrix", *SIAM Review*, 2(1), (Jan. 1960),15-22.

Kohonen, Teuvo, *Self-organization and associative memory*, Berlin; New York: Springer-Verlag,(1984),48-54.

Penrose, R., "A generalized inverse for matrices", *Proceedings of the Cambridge Philological Society*, 51, (1955),406-413.

Penrose, R., "On best approximate solutions of linear matrix equations", *Proceedings of the Cambridge Philological Society*, 52, (1956),17-19.

* cited by examiner

METHODS AND SYSTEMS TO COMPLETE TRANSACTION DATE

FIELD

The application relates generally to the field of transaction data, more specifically the methods and systems to complete transaction data, and to a machine-readable medium comprising instructions to perform this method.

BACKGROUND

Automatic Call Distribution (ACD) centers often use forecasting models to forecast transactions (e.g, calls or other communication requests) during certain periods of time. The forecasting models may be useful in determining adequate and efficient staff scheduling, for instance. Parameters for a forecasting model are often updated with new data to improve forecasting accuracy. Often, such updating is tedious and time consuming for an administrator of the forecasting model.

SUMMARY

According to an aspect of the invention there is provided a method and system to receive transaction data; determine a gap in the transaction data; and use an algorithm to generate data to fill in the gap is described. The algorithm is selected from a group including a first algorithm and a second algorithm. The first algorithm is to determine a dominant pattern in the transaction data; identify a region within the dominant pattern that corresponds to the gap in the transaction data; and adopt data associated with the corresponding region into the gap to minimize impact on the dominant pattern. The second algorithm includes a Moore-Penrose pseudo-inverse algorithm to choose the transaction data to fill in the gap based on a set of substitute data from among a group of substitute data sets and adopts the set of substitute data into the gap.

BRIEF DESCRIPTION OF DRAWINGS

An example embodiment of the present invention is illustrated by way of example and not limitation in the figures of the accompanying drawings, in which like references indicate similar elements and in which.

DETAILED DESCRIPTION

According to an aspect of the invention there is provided a method and system to receive transaction data; determine a gap in the transaction data; and use an algorithm to generate data to fill in the gap is described. The algorithm is selected from a group including a first algorithm and a second algorithm. The first algorithm is to determine a dominant pattern in the transaction data; identify a region within the dominant pattern that corresponds to the gap in the transaction data; and adopt data associated with the corresponding region into the gap to minimize impact on the dominant pattern. The second algorithm includes a Moore-Penrose pseudo-inverse algorithm to choose the transaction data to fill in the gap based on a set of substitute data from among a group of substitute data sets and adopts the set of substitute data into the gap.

Architecture

Figure 1:
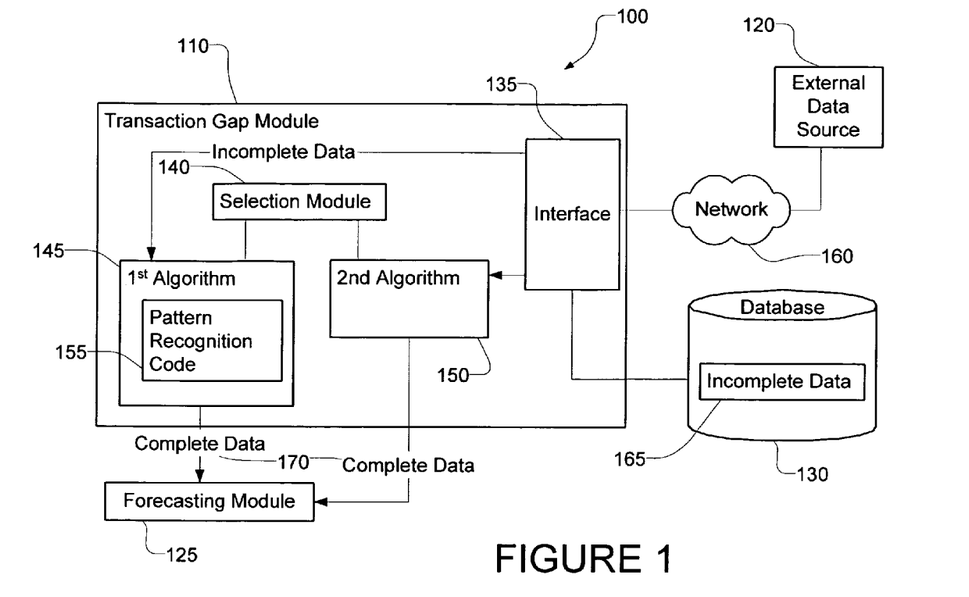
FIG. 1 illustrates a system, according to an example embodiment of the present invention.

FIG. 1 illustrates a system 100, according to an example embodiment of the present invention. The system 100 may be used in the context of Automatic Call Distribution (ACD) centers to forecast transactions (e.g., calls or other communication requests) during certain periods of time using forecast models.

The system 100 may include a transaction gap module 110, an external data source 120, a forecasting module 125, and a database 130. The transaction gap module 110 may include an interface 135 to receive transaction data from the database 130 regarding, for example, a particular forecast group and/or a particular period of time. The interface 135 may receive transaction data from the external data source 120 through a network 160, such as the Internet.

The database 130 includes data regarding frequency of transactions or calls during periods of time. The database 130 (and/or the external data source 120) may include invalid, missing or incomplete data 165.

The transaction gap module 110 determines if there is a gap (e.g., incomplete data 165) in the transaction data. The gap may be invalid data, such as a data error and/or missing/omitted data (null). The gap may be during a period of time, such as a day or a set of days in a monthly data set. A month (series of weeks) of (possibly incomplete) daily data and a list of dates of invalid data may be included in the transaction data. For each valid date in the month, the data may be a non-negative number.

The transaction gap module 110 may also include a selection module 140 used in determining which algorithm, a first algorithm 145 and/or a second algorithm 150 to use to fill in the gap or gaps in transaction data. An algorithm may replace the invalid, incomplete or missing data 165 in the forecast group with plausible and/or likely values to render a complete output. Several algorithm embodiments are described herein. For example, the first algorithm 145 may include a pattern recognition code 155. A month of daily data, where the data for each day in the month is a non-negative number, may be the output of the algorithm of the transaction gap module 110.

The transaction gap module 110 then sends the output, complete data 170 including the filled-in data, to the forecasting module 125 to forecast transactions.

Figure 2:
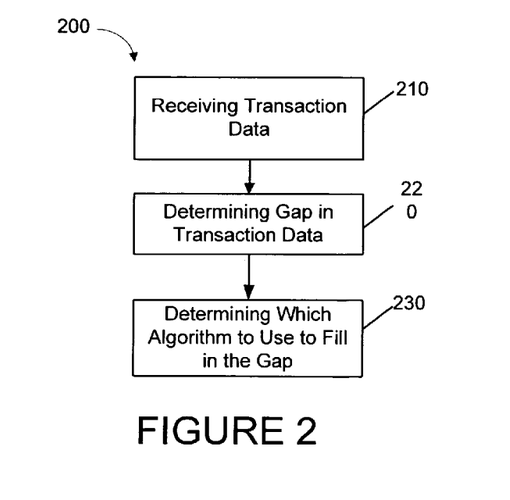
FIG. 2 illustrates a method of choosing an algorithm to fill in a transaction data gap, according to an embodiment.

FIG. 2 illustrates a method 200 of choosing an algorithm to fill in a transaction data gap, according to an embodiment.

At block 210, transaction data is received, as discussed herein.

At block 220, a gap in the transaction data is determined, as discussed herein.

Figure 3:
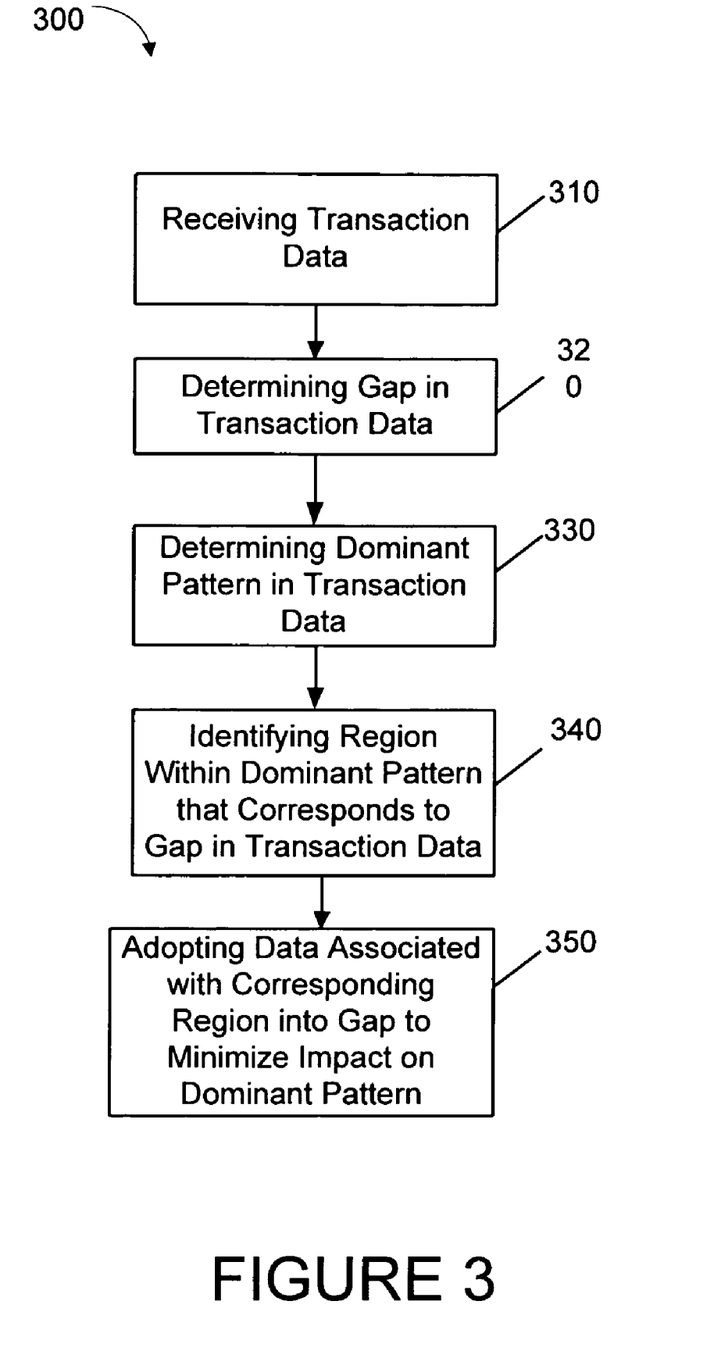
FIG. 3 illustrates a method of implementing an algorithm, according to an example embodiment of the present invention.

At block 230, the algorithm used to fill in the gap is determined. The determined algorithm may depend on the size of the dataset. Additionally, and/or alternatively, the determined algorithm may depend on the desired accuracy of the filled-in data. Additionally, and/or alternatively, the determined algorithm may depend on the desired speed to fill in the missing or invalid data The algorithm described in FIG. 4 may render more accurate results as compared with the algorithm described in FIG.

3 when there is a large quantity of invalid data, e.g., greater than 50% of the days have missing or invalid data for the given month/forecast group.

Figure 4:
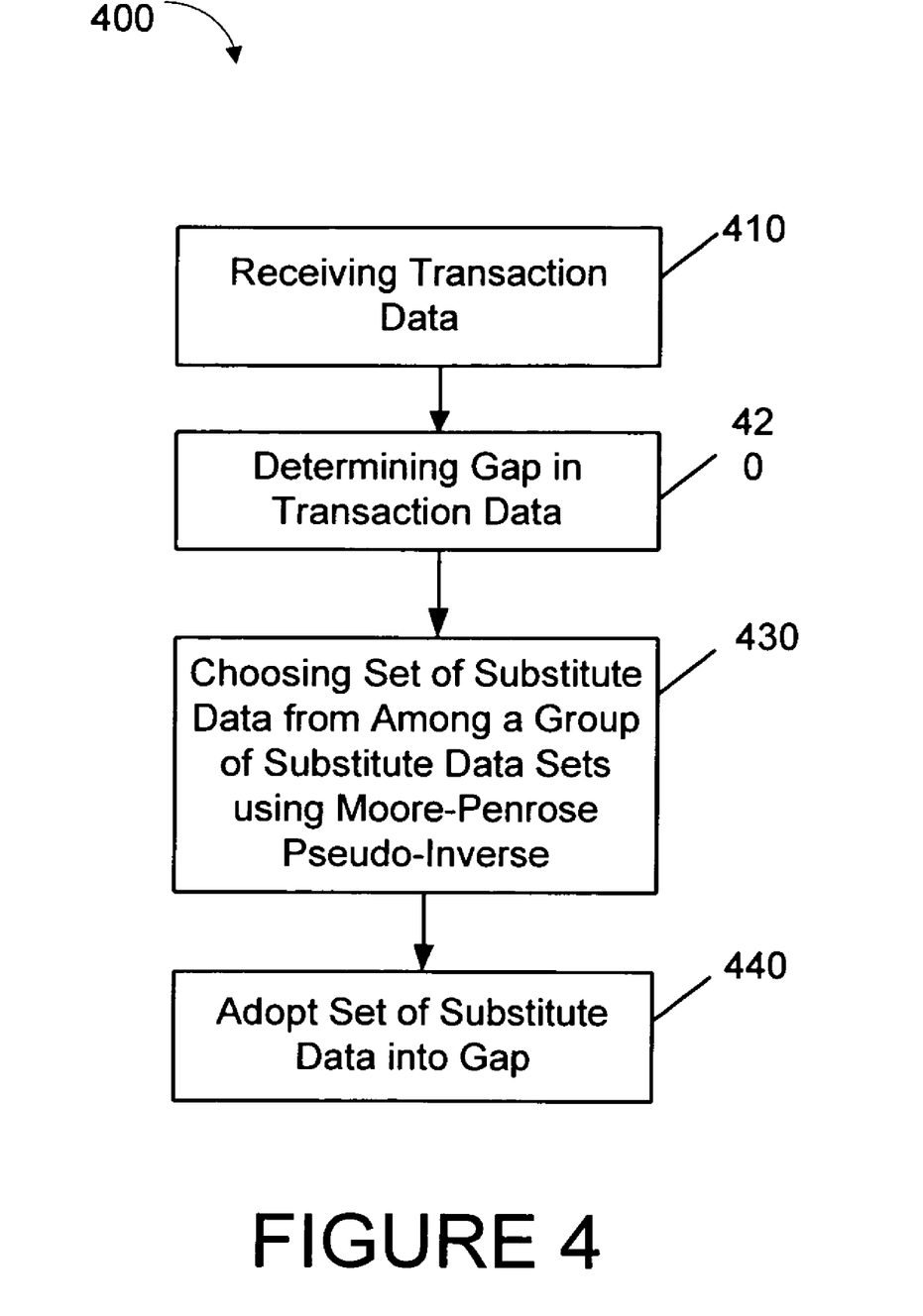
FIG. 4 illustrates a method of implementing another algorithm, according to an example embodiment of the present invention.

However, the algorithm described in FIG. 4 may be computationally more expensive as compared with the algorithm described in FIG. 3. That is, more time and more processing capabilities of a system may be expended comparatively with the algorithm FIG. 4, especially when the data sets are large. The first algorithm may be used when processing time for filling in the gap may be minimized. The second algorithm may be used when accuracy for filling in the gap is to be maximized.

FIG. 3 illustrates a method 300 of implementing an algorithm, according to an example embodiment of the present invention.

At block 310, transaction data is received, as discussed herein.

At block 320, a gap in the transaction data is determined, as discussed herein.

At block 330, a dominant pattern in the transaction data is determined, using the algorithm, as discussed herein. The dominant pattern may be determined by the pattern recognition code 155.

At block 340, a region within the dominant pattern that corresponds to the gap in the transaction data may be identified, using the algorithm, as discussed herein.

At block 350, data associated with the corresponding region may be adopted into the gap to minimize impact on the dominant pattern, using the algorithm, as discussed herein.

Using the algorithm, invalid and/or missing data may be replaced with values that are consistent with the arrangement of the valid data. The algorithm and/or the transaction gap module 110 may also take into consideration any restrictions of the forecasting module 125 of the forecasting module. A forecasting module restriction may be that the number of calls during each week has the same pattern throughout the month, for example.

The algorithm of the embodiment of FIG. 3 may work best when the valid data is not too sparse in a given month. The valid data is not too sparse, for example, when the ratio of valid data to invalid data is greater than 1:1. The actual arrangement of days with invalid data and the degree of dominance of the pattern in the valid data may also impact the quality of the fill and/or a confidence in the fill.

Two examples of how the algorithm of FIG. 3 behaves for sparse valid data are described further below. Sparse valid data, as used here, may denote a qualitative and comparative state of a set of the data where there is less valid data than in some other comparable set of data.

In the below examples, in the first algorithm where a dominant pattern in the data may be determined and adopted to fill in the gap (e.g., null data sets), (i,j) refers to a $j^{th}$ day of an $i^{th}$ week, for n weeks with m days in each week, wherein $x_{ij}$ includes valid numerical data, and if data is not valid on (i,j), $x_{ij}$=null.

$v_{ij}$ includes $v_{ij}=x_{ij}$, unless $x_{ij}=0$, in which case, $v_{ij}$=null, wherein $w_{ij}$ includes $w_{ij}=\ln(v_{ij})$ whenever $v_{ij}$ is not null, and $w_{ij}$=null whenever $v_{ij}$=null.

A matrix of column differences, $c_{ij}$, includes $c_{ij}=w_{ij+1}-w_{ij}$ whenever both $w_{ij+1}$ and $w_{ij}$ are not null, and $c_{ij}$=null, otherwise.

A matrix of row differences, $r_{ij}$, includes $r_{ij}=w_{i+1j}-w_{ij}$ whenever both $w_{i+1j}$ and $w_{ij}$ are not null, and $r_{ij}$=null, otherwise.

A $j^{th}$ column of $c_{ij}$ includes at least one non-null entry, and $c_{*j}$ includes an average of each non-null entry in the $j^{th}$ column of $c_{ij}$, otherwise, $c_{*j}$=0.

An $i^{th}$ row of $r_{ij}$ includes at least one non-null entry, and $r_{i*}$ includes an average of each non-null entry in the $i^{th}$ row of $r_{ij}$, otherwise, $r_{i*}$=0.

$C_{j+1}=C_j+c_{*j}$, where $C_1=0$, wherein $R_{i+1}=R_i+r_{i*}$, wherein $R_1=0$, and $u_{ij}=R_i+C_j$.

K includes an average of $w_{ij}-u_{ij}$ over each (i,j) entry where $w_{ij}$ is not null.

$y_{ij}=w_{ij}$ whenever $w_{ij}$ is not null and otherwise, $y_{ij}=K+u_{ij}$.

Output $z_{ij}$=Round(exp($y_{ij}$)), where each date and time period includes valid data. $z_{ij}$ is the matrix that is sent on to the forecasting model or module. $z_{ij}$ may be sent through a sequence of one or more modules to be analyzed. Results may then be sent to a module that updates parameters of the forecasting module.

Logarithms may be taken of particular values so that multiplicative effects between day-of-the-week and week-of-the-month may be conveniently expressed as additive effects. In some implementations, it may be more convenient for the algorithm to work with additive effects than directly with the multiplicative effects. For example, multiplicative effect: m_effect=affect1*affec2; Additive: a_effect=affect3+affect4; log(m_effect)=log(affect1*affect2)=log(affect1)+log(affect2). By taking logs, a multiplicative effect can be treated as an additive effect where log(m_effect)=a_effect, log(affect1)=affect3, log(affect2)=affect4.

A first example of how the above-recited functions of the algorithm of FIG. 3 behaves for sparse valid data is as follows:

$$\text{Where } w_{ij} = \begin{pmatrix} \text{null} & -2 & 1 & 3 & \text{null} & 0 & -3 \\ 7 & 3 & \text{null} & 8 & 10 & 5 & \text{null} \\ \text{null} & \text{null} & -1 & \text{null} & \text{null} & -2 & \text{null} \\ \text{null} & \text{null} & 4 & 6 & \text{null} & \text{null} & \text{null} \\ \text{null} & \text{null} & 3 & \text{null} & \text{null} & \text{null} & \text{null} \end{pmatrix}$$

$$\text{and thus where } y_{ij} = \begin{pmatrix} 2 & -2 & 1 & 3 & 5 & 0 & -3 \\ 7 & 3 & 6 & 8 & 10 & 5 & 2 \\ 0 & -4 & -1 & 1 & 3 & -2 & -5 \\ 5 & 1 & 4 & 6 & 8 & 3 & 0 \\ 4 & 0 & 3 & 5 & 7 & 2 & -1 \end{pmatrix}$$

Here is another example where $w_{ij}$ =

$$\begin{pmatrix} \text{null} & \text{null} & \text{null} & \text{null} & \text{null} & \text{null} & \text{null} \\ \text{null} & \text{null} & \text{null} & \text{null} & \text{null} & \text{null} & \text{null} \\ \text{null} & \text{null} & 1 & \text{null} & \text{null} & \text{null} & \text{null} \\ \text{null} & \text{null} & \text{null} & \text{null} & \text{null} & \text{null} & \text{null} \\ \text{null} & \text{null} & \text{null} & \text{null} & \text{null} & \text{null} & \text{null} \end{pmatrix}$$

$$\text{And thus, where } y_{ij} = \begin{pmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{pmatrix}$$

In another embodiment, the method is similar to "Fill in Days" for monthly updates described above, however day-of-the-week is replaced by time-period and week-of-the-month is replaced by comparable date. In a particular embodiment, n becomes the number of comparable dates, m becomes the number of time-periods within a day, i becomes an index for comparable dates and j becomes an index for time-period of a day. The calculations are completed using the above described functions in the algorithm of FIG. 3.

FIG. 4 illustrates a method 400 of implementing another algorithm, according to an example embodiment of the present invention.

At block 410, transaction data may be received, as discussed herein.

At block 420, a gap in the transaction data may be determined, as discussed herein.

At block 430, a set of substitute data may be chosen from among a group of substitute data sets using a Moore-Penrose pseudo-inverse algorithm.

At block 440, the set of substitute data may be adopted into the determined gap.

In an embodiment, the Moore-Penrose pseudo-inverse algorithm may be more accurate as compared with the algorithm of FIG. 3 when the valid data is quite sparse (when the count of valid data is, for example, less than n+m) and the invalid data is plentiful. However, the Moore-Penrose pseudo-inverse algorithm may be associated with much more computation (in both space and time), and therefore may be less practical, especially when the data sets are large. For example, a set comprising several hundred comparable days where each day has one hundred periods may be considered large. A parameter may be set based on the data set size, for example, by the user or the administrator to determine which algorithm to use.

In an embodiment, the Moore-Penrose pseudo-inverse algorithm may fill in null or invalid data by producing an optimal "fill in".

Let $w_{ij}$ be the same as defined above with regard to the algorithm of FIG. 3, and let W denote the matrix of the $w_{ij}$.

For $p=1, 2, \ldots, n+m$ and $q=1, 2, \ldots, n+m$, let $f_{pq}$ denote the elements of an n+m by n+m matrix, F, called the "filler". The filler is a symmetric matrix, defined in the following way:

For $p=1, 2, \ldots, n$ and $q=1, 2, \ldots, n$, let $f_{pp}$=the number of non-null entries in the $p^{th}$ row of W and let $f_{pq}=0$ when $p \neq q$. For $p=n+1, n+2, \ldots, n+m$ and $q=n+1, n+2, \ldots, n+m$, let $f_{pp}$=the number of non-null entries in the $(p-n)^{th}$ column of W and let $f_{pq}=0$ when $p \neq q$. For $p=1, 2, \ldots, n$ and $q=n+1, n+2, \ldots, n+m$, let $f_{pq}=1$ when $w_{pq-n}$ is not null and $f_{pq}=0$ when $w_{pq-n}$ is null. For $p=n+1, n+2, \ldots, n+m$ and $q=1, 2, \ldots, n$, let $f_{pq}=1$ when $w_{qp-n}$ is not null and $f_{pq}=0$ when $w_{qp-n}$ is null.

If A is some real matrix and B is a real matrix such that ABA=B, BAB=A, AB is symmetric, and BA is symmetric, then B is called a Moore-Penrose pseudoinverse of A. It is a theorem that every real matrix has a mathematically unique Moore-Penrose pseudoinverse. Let $F^+$ denote the pseudoinverse of F. Let $F^+$ be computed from F using, say, Greville's Theorem.

Let b denote the average of the non-null values of W.

For $i=1, 2, \ldots, n$ and $j=1, 2, \ldots, m$, define $\tilde{w}_{ij}$ by the rule $\tilde{w}_{ij}=w_{ij}-b$ when $w_{ij}$ is not null and $\tilde{w}_{ij}$=null otherwise. Let $\tilde{W}$ denote the n by m matrix of the $\tilde{w}_{ij}$.

Define a real vector, g, with n+m components $g_k$, for $k=1, 2, \ldots, n+m$, by the following rules: For $k=1, 2, \ldots, n$, let $g_k$=sum of the non-null elements in the $k^{th}$ row of $\tilde{W}$ when at least one such element is not null and let $g_k=0$ when every element in the $k^{th}$ row of $\tilde{W}$ is null.

For $k=1+n, 2+n, \ldots, m+n$, let $g_k$ equal the sum of the non-null element sin the $(k-n)^{th}$ column of $\tilde{W}$ when at least one such element is not null and let $g_k=0$ when every element in the $(k-n)^{th}$ column of $\tilde{W}$ is null.

Define a real vector, h, with n+m components $h_k$, for $k=1, 2, \ldots, n+m$, by the following rule: $h=F^+g$. The components of h are used to determine values to replace the null data in W as follows: For $i=1, 2, \ldots, n$, let $R_i=h_i$. For $j=1, 2, \ldots, m$, let $C_j=h_{j+n}$. Define $u_{ij}$ by the rule $u_{ij}=R_i+C_j$. Let $y_{ij}=w_{ij}$ whenever $w_{ij}$ is not null and otherwise, let $y_{ij}=u_{ij}+b$.

The real matrix of the $y_{ij}$, Y, can be thought of as the matrix, W, with the null values filled in with data that is considered "valid". As described above, W may be obtained by taking logarithms of the original data, $x_{ij}$. Now let $z_{ij}=x_{ij}$ wherever $x_{ij}$ has valid data and let $z_{ij}=\text{Round}(\exp(y_{ij}))$ otherwise.

Output the $z_{ij}$.

In an example embodiment, the algorithm of FIG. 4 may be executed as follows, using the same first matrix, W, used in the example of the algorithm of FIG. 3, where W=

$$\begin{bmatrix} \text{null} & -2 & 1 & 3 & \text{null} & 0 & -3 \\ 7 & 3 & \text{null} & 8 & 10 & 5 & \text{null} \\ \text{null} & \text{null} & -1 & \text{null} & \text{null} & -2 & \text{null} \\ \text{null} & \text{null} & 4 & 6 & \text{null} & \text{null} & \text{null} \\ \text{null} & \text{null} & 3 & \text{null} & \text{null} & \text{null} & \text{null} \end{bmatrix}$$

the corresponding filler, F, =

$$\begin{bmatrix} 5 & 0 & 0 & 0 & 0 & 1 & 1 & 1 & 0 & 1 & 1 \\ 0 & 5 & 0 & 0 & 0 & 1 & 1 & 0 & 1 & 1 & 0 \\ 0 & 0 & 2 & 0 & 0 & 0 & 1 & 0 & 0 & 1 & 0 \\ 0 & 0 & 0 & 2 & 0 & 0 & 0 & 1 & 1 & 0 & 0 \\ 0 & 0 & 0 & 0 & 1 & 0 & 0 & 1 & 0 & 0 & 0 \\ 0 & 1 & 0 & 0 & 0 & 1 & 0 & 0 & 0 & 0 & 0 \\ 1 & 1 & 0 & 0 & 0 & 0 & 2 & 0 & 0 & 0 & 0 \\ 1 & 0 & 1 & 1 & 1 & 0 & 0 & 4 & 0 & 0 & 0 \\ 1 & 1 & 0 & 1 & 0 & 0 & 0 & 0 & 3 & 0 & 0 \\ 0 & 1 & 0 & 0 & 0 & 0 & 0 & 0 & 0 & 1 & 0 \\ 1 & 1 & 1 & 0 & 0 & 0 & 0 & 0 & 0 & 3 & 0 \\ 1 & 0 & 0 & 0 & 0 & 0 & 0 & 0 & 0 & 0 & 1 \end{bmatrix}$$

Thus, $F^+$ is approximately:

[2.31082375478927E-0001, -5.34003831417627E-0002, -3.04118773946362E-0002, -3.04118773946361E-0002, -8.21360153256704E-0002, 1.36733716475096E-0001, -4.71743295019157E-0002, -1.19731800766277E-0003, -2.13122605363984E-0002, 1.36733716475096E-0001, -2.13122605363983E-0002, -1.47749042145594E-0001]
[-5.34003831417628E-0002, 2.82806513409962E-0001, -1.07998084291187E-0001, -1.07998084291187E-0001, -2.28687739463601E-0001, -1.99473180076628E-0001, -7.30363984674330E-0002, 1.45354406130268E-0001, -1.26915708812260E-0002, -1.99473180076629E-0001, -1.26915708812261E-0002, 1.36733716475096E-0001]
[-3.04118773946362E-0002, -1.07998084291187E-0001, 5.77059386973180E-0001, -2.29406130268199E-0002, 3.56800766283525E-0002, 1.91331417624521E-0001, 1.10871647509578E-0001, -1.19013409961685E-0001, 8.15613026819923E-0002, 1.91331417624521E-0001, -1.18438697318007E-0001, 1.13745210727969E-0001]
[-3.04118773946362E-0002, -1.07998084291187E-0001, -2.29406130268199E-0002, 5.77059386973180E-0001, 3.56800766283525E-0002, 1.91331417624521E-0001, 1.10871647509578E-0001, -1.19013409961685E-0001, -1.18438697318007E-0001, 1.91331417624521E-0001, 8.15613026819924E-0002, 1.13745210727969E-0001]

[-8.21360153256706E-0002, -2.28687739463602E-0001,
3.56800766283525E-0002, 3.56800766283527E-0002,
1.19085249042146E+0000, 3.12021072796935E-0001,
1.97078544061303E-0001, -2.74185823754789E-0001,
1.19492337164750E-0001, 3.12021072796935E-0001,
1.19492337164751E-0001, 1.65469348659004E-0001]
[1.36733716475096E-0001, -1.99473180076629E-0001,
1.91331417624521E-0001, 1.91331417624521E-0001,
3.12021072796935E-0001, 1.11613984674330E+0000,
-1.02969348659003E-0002, -2.28687739463601E-0001,
-7.06417624521073E-0002, 1.16139846743295E-0001,
-7.06417624521072E-0002, -2.20067049808430E-0001]
[4.71743295019156E-0002, -7.30363984674331E-0002,
1.10871647509578E-0001, 1.10871647509578E-0001,
1.97078544061303E-0001, -1.02969348659003E-0002,
5.18438697318008E-0001, -1.13745210727969E-0001,
-2.46647509578544E-0002, -1.02969348659001E-0002,
-2.46647509578544E-0002, -3.61590038314179E-0002]
[-1.19731800766279E-0003, 1.45354406130268E-0001,
-1.19013409961685E-0001, -1.19013409961686E-0001,
-2.74185823754789E-0001, -2.28687739463602E-0001,
-1.13745210727969E-0001, 3.57519157088123E-0001,
-3.61590038314176E-0002, -2.28687739463601E-0001,
-3.61590038314176E-0002, -8.21360153256707E-0002]
[-2.13122605363983E-0002, -1.26915708812260E-0002,
8.15613026819924E-0002, -1.18438697318007E-0001,
1.19492337164750E-0001, -7.06417624521073E-0002,
-2.46647509578544E-0002, -3.61590038314177E-0002,
3.56369731800766E-0001, -7.06417624521072E-0002,
-4.36302681992338E-0002, -6.20210727969350E-0002]
[1.36733716475096E-0001, -1.99473180076629E-0001,
1.91331417624521E-0001, 1.91331417624521E-0001,
3.12021072796935E-0001, 1.16139846743295E-0001,
-1.02969348659002E-0002, -2.28687739463602E-0001,
-7.06417624521074E-0002, 1.11613984674330E+0000,
-7.06417624521072E-0002, -2.20067049808430E-0001]
[-2.13122605363983E-0002, -1.26915708812263E-0002,
-1.18438697318007E-0001, 8.15613026819924E-0002,
1.19492337164750E-0001, -7.06417624521073E-0002,
-2.46647509578544E-0002, -3.61590038314175E-0002,
-4.36302681992337E-0002, -7.06417624521071E-0002,
3.56369731800766E-0001, -6.20210727969353E-0002]
[-1.47749042145596E-0001, 1.36733716475097E-0001,
1.13745210727970E-0001, 1.13745210727969E-0001,
1.65469348659004E-0001, -2.20067049808429E-0001,
-3.61590038314176E-0002, -8.21360153256708E-0002,
-6.20210727969352E-0002, -2.20067049808430E-0001,
-6.20210727969354E-0002, 1.06441570881226E+0000]]

For the first matrix, W, b=2.8, and the elements of $\tilde{W}$ include:

$$\begin{bmatrix} \text{null} & -4.8 & -1.8 & .2 & \text{null} & -2.8 & -5.8 \\ 4.2 & .2 & \text{null} & 5.2 & 7.2 & 2.2 & \text{null} \\ \text{null} & \text{null} & -3.8 & \text{null} & \text{null} & -4.8 & \text{null} \\ \text{null} & \text{null} & 1.2 & 3.2 & \text{null} & \text{null} & \text{null} \\ \text{null} & \text{null} & .2 & \text{null} & \text{null} & \text{null} & \text{null} \end{bmatrix}$$

g is given by $$g = \begin{pmatrix} -15 \\ 19 \\ -8.6 \\ 4.4 \\ .2 \\ 4.2 \\ -4.6 \\ -4.2 \\ 8.6 \\ 7.2 \\ -5.4 \\ -5.8 \end{pmatrix}$$

Finding $F^+$ by Greville's Theorem, computing $h = F^+g$, and solving for the $y_{ij}$ in terms of the components of h recovers a matrix that is identical to the $y_{ij}$ matrix generated by the algorithm of FIG. 3. However, the computations for the $y_{ij}$ matrix generated by the algorithm of FIG. 4, may be computationally more expensive.

The component of the algorithm described here, acts upon the logarithms of the raw data, in the instance where that raw data is not null and not zero. The logarithms may be placed in a (not real) n by m matrix, W, whose elements are either real numbers or null, where at least one entry is not null.

In an embodiment of the algorithm of FIG. 3, let $w_{ij}$ denote the entries of the logarithm matrix, W. Each $w_{ij}$ is either a real number or null. For any set, A, let o(A) denote the cardinality of A.

The set, S, may be defined by the rule $S=\{(i,j)|w_{ij} \neq null\}$.

μ may be defined by the rule $$\mu = \frac{1}{o(S)} \sum_{(i,j) \in S} w_{ij}.$$

$y_{ij}$ may be defined by the rule $$y_{ij} = \begin{cases} w_{ij} - \mu; & (i,j) \in S \\ \text{null}; & (i,j) \notin S \end{cases}.$$

Y may be defined to be the matrix of $y_{ij}$.

V may be defined to be a real-valued function of n+m real variables so that $V=V(r_1, \ldots, r_n, c_1, \ldots, c_m)$ where $$V(r_1, \ldots, r_n, c_1, \ldots, c_m) = \sum_{(i,j) \in S} (y_{ij} - r_i - c_j)^2.$$

V is a non-negative quadratic function, so V may have a global minimum value, but there may be many values of $(r_1, \ldots, r_n, c_1, \ldots, c_m)$ that achieve this minimum value of V. To find a minimum of V, points where V is stationary are sought. That is, where $$\frac{\partial V}{\partial r_k} = 0; \quad k = 1, \ldots, n$$
$$\frac{\partial V}{\partial c_l} = 0; \quad l = 1, \ldots, m, \text{ but}$$

$$\frac{\partial V}{\partial r_k} = -\sum_{(i,j) \in S} 2(y_{ij} - r_i - c_j) \delta_{ik}$$
$$= -\sum_{(k,j) \in S} 2(y_{kj} - r_k - c_j),$$

for $k = 1, \ldots, n$ and $$\frac{\partial V}{\partial c_l} = -\sum_{(i,j) \in S} 2(y_{ij} - r_i - c_j) \delta_{jl}$$
$$= -\sum_{(i,l) \in S} 2(y_{il} - r_i - c_l),$$

for $l = 1, \ldots, m$.

Therefore a minimum satisfies:

$$\sum_{(k,j) \in S} 2(y_{ij} - r_i - c_j) = 0; \quad k = 1, \ldots, n$$
$$\sum_{(i,l) \in S} 2(y_{il} - r_i - c_l) = 0; \quad l = 1, \ldots, m$$

The first n sums may be over "non-null" elements in the $k^{th}$ row of Y. The second m sums may be over the "non-null" elements in the $l^{th}$ column of Y.

Let $P_k = \{j | (i,j) \in S \text{ and } i = k\}$ and let $Q_l = \{i | (i,j) \in S \text{ and } j = l\}$. The system of equations may be written as $$\sum_{j \in P_k} (y_{kj} - r_k - c_j) = 0; \quad k = 1, \ldots, n$$
$$\sum_{i \in Q_l} (y_{il} - r_i - c_l) = 0; \quad l = 1, \ldots, m$$

or $$\sum_{j \in P_k} r_k + \sum_{j \in P_k} c_j = \sum_{j \in P_k} y_{kj}; \quad k = 1, \ldots, n$$
$$\sum_{i \in Q_l} r_i + \sum_{i \in Q_l} c_l = \sum_{i \in Q_l} y_{il}; \quad l = 1, \ldots, m$$

or $$O(P_k) r_k + \sum_{j \in P_k} c_j = \sum_{j \in P_k} y_{kj}; \quad k = 1, \ldots, n$$
$$\sum_{i \in Q_l} r_i + O(Q_l) c_l = \sum_{i \in Q_l} y_{il}; \quad l = 1, \ldots, m.$$

Note that $o(P_k)$ is the number of non-null elements in the $k^{th}$ row of Y and that $o(Q_l)$ is the number of non-null elements in the $l^{th}$ column of Y. Also note that $$\sum_{j \in P_k} y_{kj}$$

is the sum of the non-null elements in the $k^{th}$ row of Y and $$\sum_{i \in Q_l} y_{il}$$

is the sum of the non-null elements in the $l^{th}$ column of Y.

The system of equations shown above comprises n+m simultaneous linear equations in n+m variables. As such, the system of equations may be expressed as a vector-matrix equation in $R^{n+m}$ of the form Fh=g, where F is an n+m by n+m real matrix and both g and h are vectors in $R^{n+m}$.

The vectors $h$ and $g$:
$$h = \begin{pmatrix} r_1 \\ \vdots \\ r_n \\ c_1 \\ \vdots \\ c_m \end{pmatrix}, \quad g = \begin{pmatrix} \sum_{j \in P_1} y_{1j} \\ \vdots \\ \sum_{j \in P_n} y_{nj} \\ \sum_{i \in Q_1} y_{i1} \\ \vdots \\ \sum_{i \in Q_m} y_{im} \end{pmatrix}.$$

In order to describe F, the symbol, $\epsilon_{ij}$, may be used, where $\epsilon_{ij} = 1$, when $y_{ij}$ is not null and $\epsilon_{ij} = 0$, when $y_{ij}$ is null.

$$F = \begin{pmatrix} o(P_1) & 0 & \cdots & 0 & \epsilon_{11} & \epsilon_{12} & \cdots & \epsilon_{1m} \\ 0 & o(P_2) & \cdots & 0 & \epsilon_{21} & \epsilon_{22} & \cdots & \epsilon_{2m} \\ \vdots & \vdots & \ddots & \vdots & \vdots & \vdots & \ddots & \vdots \\ 0 & 0 & \cdots & o(P_n) & \epsilon_{n1} & \epsilon_{n2} & \cdots & \epsilon_{nm} \\ \epsilon_{11} & \epsilon_{21} & \cdots & \epsilon_{n1} & o(Q_1) & 0 & \cdots & 0 \\ \epsilon_{12} & \epsilon_{22} & \cdots & \epsilon_{n2} & 0 & o(Q_2) & \cdots & 0 \\ \vdots & \vdots & \ddots & \vdots & \vdots & \vdots & \ddots & \vdots \\ \epsilon_{1m} & \epsilon_{2m} & \cdots & \epsilon_{nm} & 0 & 0 & \cdots & o(Q_m) \end{pmatrix}.$$

The matrix F is a symmetric matrix. The elements on the diagonal of the matrix F may be expressed in terms of the $\epsilon_{ij}$ term, as follows:

$$F = \begin{pmatrix} \sum_j \epsilon_{1j} & 0 & \cdots & 0 & \epsilon_{11} & \epsilon_{12} & \cdots & \epsilon_{1m} \\ 0 & \sum_j \epsilon_{2j} & \cdots & 0 & \epsilon_{21} & \epsilon_{22} & \cdots & \epsilon_{2m} \\ \vdots & \vdots & \ddots & \vdots & \vdots & \vdots & \ddots & \vdots \\ 0 & 0 & \cdots & \sum_j \epsilon_{nj} & \epsilon_{n1} & \epsilon_{n2} & \cdots & \epsilon_{nm} \\ \epsilon_{11} & \epsilon_{21} & \cdots & \epsilon_{n1} & \sum_i \epsilon_{i1} & 0 & \cdots & 0 \\ \epsilon_{12} & \epsilon_{22} & \cdots & \epsilon_{n2} & 0 & \sum_i \epsilon_{i2} & \cdots & 0 \\ \vdots & \vdots & \ddots & \vdots & \vdots & \vdots & \ddots & \vdots \\ \epsilon_{1m} & \epsilon_{2m} & \cdots & \epsilon_{nm} & 0 & 0 & \cdots & \sum_i \epsilon_{im} \end{pmatrix}.$$

The equation Fh=g includes at least one solution, and possibly an infinite number of solutions. An infinite number of values may minimize $V=V(r_1,\ldots,r_n,c_1,\ldots,c_m)$. The solution chosen to use for the fill in may be the solution that leads to a most conservative approximation of the $y_{ij}$ by the values of $r_i+c_j$. Such a solution, h, is one for which $\|h\|$ is minimum. In other words, find an h, such that $Fh=g$ and $\|h\|$ is minimum. Such as h may be found by means of the pseudoinverse of F. The pseudoinverse of F is a mathematically unique matrix, denoted $F^+$. The solution for h, such that $\|h\|$ is minimum, may be given by $h=F^+g$.

This result follows from the definition of pseudoinverse, where:
$FF^+F=F$, $F^+FF^+=F^+$, $FF^+=(FF^+)^T$, and $F^+F=(F^+F)^T$.

The above-recited relations imply that $(F^+F)(F^+F)=F^+F$ and $(FF^+)(FF^+)=FF^+$, so that, in virtue of their symmetries, $F^+F$ and $FF^+$ are both projections. For any x in $R^{n+m}$, either of these projections determines a decomposition of x into orthogonal components:

$$x=(I-F^+F)x+(F^+F)x \text{ or } x=(I-FF^+)x+(FF^+)x,$$

so that $(x,x)=((I-F^+F)x,(I-F^+F)x)+((F^+F)x,(F^+F)x)$ or $(x,x)=((I-FF^+)x,(I-FF^+)x,(I-FF^+)x)+((FF^+x),(FF^+x))$, respectively.

$(F^+Fx,F^+Fx) \leq (x,x)$ and $(FF^+x,FF^+x) \leq (x,x)$ for any x in $R^{n+m}$. Also, if $(F^+Fx,F^+Fx)=(x,x)$ or $(FF^+x,FF^+x)=(x,x)$, respectively, then $((I-F^+F)x,(I-F^+F)x)=0$ or $((I-FF^+)x,(I-FF^+)x)=0$, respectively, so that $(I-F^+F)x=0$ or $(I-FF^+)x=0$, respectively. This forces $F^+Fx=x$ or $FF^+x=x$, respectively. Therefore, if $(F^+Fx,F^+Fx)=(x,x)$ then $F^+Fx=x$ and if $(FF^+x,FF^+x)=(x,x)$ then $FF^+x=x$.

$\bar{h}$ may be defined by the rule $\bar{h}=F^+g$. Then $F\bar{h}=FF^+g$, $F^+F\bar{h}=F^+FF^+g=F^+g=\bar{h}$, so that $F^+F\bar{h}=\bar{h}$.

Suppose there is an $\tilde{h}$ such that $F\tilde{h}=g$, then $F^+F\tilde{h}=F^+g=\bar{h}$ and so that $(\tilde{h},\tilde{h})=(F^+F\tilde{h},F^+F\tilde{h}) \leq (\tilde{h},\tilde{h})$ for any solution, $\tilde{h}$.

$F\bar{h}=FF^+F\tilde{h}=F\tilde{h}=g$, therefore, $\bar{h}$ is a solution to $Fh=g$ for which $\|h\|$ is minimum. Furthermore, suppose $(\tilde{h},\tilde{h})=(\bar{h},\bar{h})$ then $(\tilde{h},\tilde{h})=(F^+g,F^+g)=(F^+F\tilde{h},F^+F\tilde{h})$ and, because $F^+F$ is a projection, $F^+F\tilde{h}=\tilde{h}$ by implication. Again, because $\bar{h}$ is a solution, $F^+g=\bar{h}$; but $F^+g=\tilde{h}$, so $\tilde{h}=\bar{h}$. Therefore, if $(\tilde{h},\tilde{h})=(\bar{h},\bar{h})$ then $\tilde{h}=\bar{h}$. Therefore, $\bar{h}=F^+g$ is a mathematically unique solution to $Fh=g$, for which $\|h\|$ is minimum.

The components of $\bar{h}$ give the values of $r_i$ and $c_j$ used to fill in the null values of W as follows: If $(i,j) \notin S$, then $w_{ij}=r_i+c_j+\mu$. Otherwise, the value of $w_{ij}$ remains unchanged.

The automated update algorithms described herein may make consistent judgments about enormous quantities of numerical data, and may reduce the risk that clerical errors associated with manual update activities may deform the forecast model. Automated introduction of the new data may avoid inappropriate changes in the day of week patterns that are extracted from the data, which may reduce deformation of the forecast model.

Computer Architecture

Figure 5:
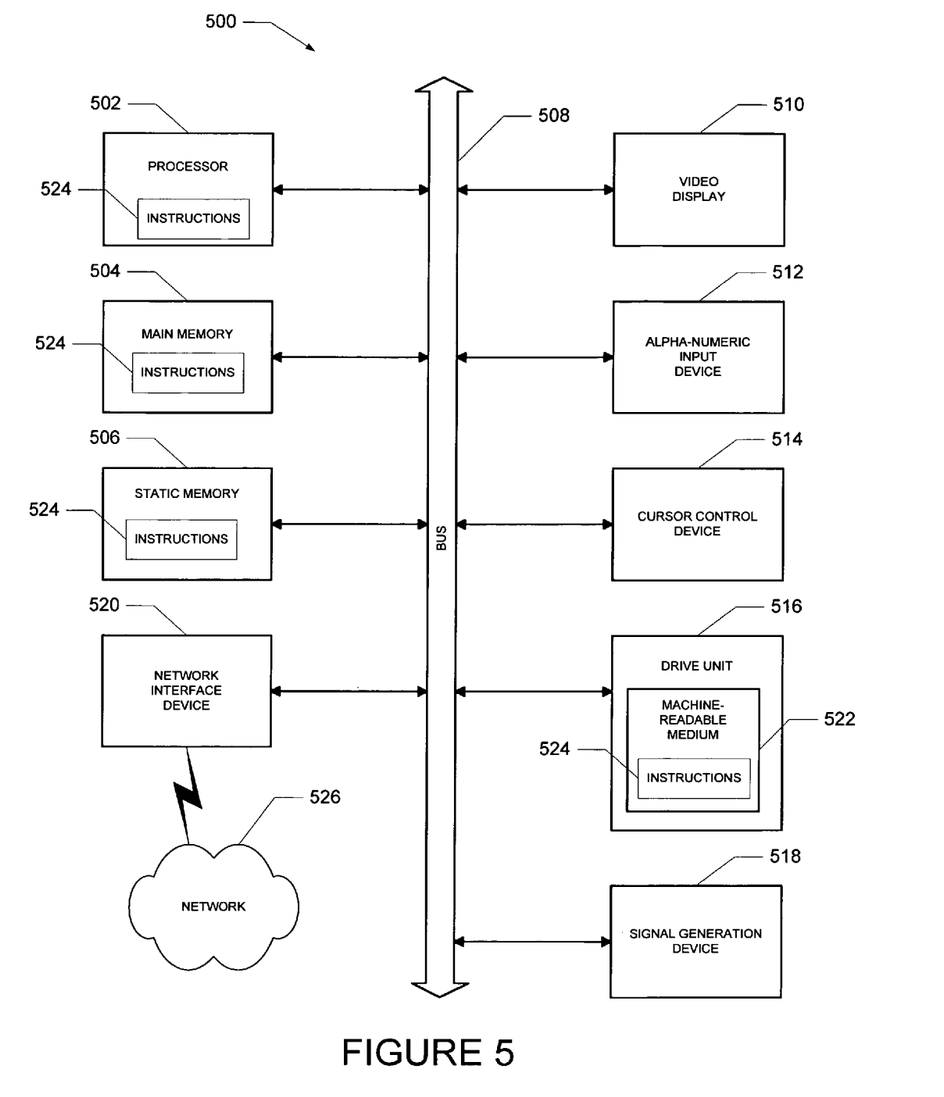
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
receiving incomplete transaction data at an interface to a processing circuit;
determining by the processing circuit a gap in the incomplete transaction data; and
using an algorithm implemented by the processing circuit to generate data to fill in the gap and to generate complete transaction data, wherein the algorithm is selected by the processing circuit from a group including at least a first algorithm and a second algorithm, wherein the first algorithm is automatically to:
- determine a dominant pattern in the transaction data;
- identify a region within the dominant pattern that corresponds to the gap in the transaction data; and
- adopt data associated with the corresponding region in the gap to minimize impact on the dominant pattern;

wherein the second algorithm includes a Moore-Penrose pseudo-inverse algorithm to choose at least a portion of the transaction data to fill in the gap based on a set of substitute data from among a group of substitute data sets and to adopt the set of substitute data into the gap; and where the first algorithm includes
- (i, j) referring to a $j^{th}$ day of an $i^{th}$ week, for n weeks with m days in each week,
- wherein $x_{ij}$ includes valid numerical data, and if the data is not valid on (i,j), $x_{ij}$=null,
- wherein $v_{ij}$ includes $v_{ij}$=$x_{ij}$, unless $x_{ij}$=0, in which case, $v_{ij}$=null,
- wherein $w_{ij}$ includes $w_{ij}$=ln($v_{ij}$) whenever $v_{ij}$ is not null, and $w_{ij}$=null whenever $v_{ij}$=null,
- wherein a matrix of column differences, $c_{ij}$, includes $c_{ij}$=$w_{ij+1}$−$w_{ij}$ whenever both $w_{ij+1}$ and $w_{ij}$ are not null, and $c_{ij}$=null, otherwise,
- wherein a matrix of row differences, $r_{ij}$, includes $r_{ij}$=$w_{i+1j}$−$w_{ij}$ whenever both $w_{i+1j}$ and $w_{ij}$ are not null, and $r_{ij}$=null, otherwise,
- wherein a $j^{th}$ column of $c_{ij}$ includes at least one non-null entry, and $c_{*j}$ includes an average of each non-null entry in the $j^{th}$ column of $c_{ij}$, otherwise, $c_{*j}$=0,
- wherein an $i^{th}$ row of $r_{ij}$ includes at least one non-null entry, and $r_{i*}$ includes an average of each non-null entry in the $i^{th}$ row of $r_{ij}$, otherwise, $r_{i*}$=0,
- wherein $C_{j+1}$=$C_j$+$c_{*j}$, where $C_1$=0,
- wherein $R_{i+1}$=$R_i$+$r_{i*}$, where $R_1$=0,
- wherein $u_{ij}$+$R_i$+$C_j$,
- wherein K includes an average of $w_{ij}$−$u_{ij}$ over each (i, j) entry where $w_{ij}$ is not null,
- wherein $y_{ij}$=$w_{ij}$ whenever $w_{ij}$ is not null and otherwise, $y_{ij}$=K+$u_{ij}$,
- wherein output $z_{ij}$=Round(exp($y_{ij}$)), wherein the output $z_{ij}$ corresponds to filling in the gap.

2. The method of claim 1 wherein the algorithm is selected based upon at least one of amount of the transaction data, forecasting module restrictions, and a ratio of valid data to gap data.

3. The method of claim 1 wherein the algorithm is selected based upon one of maximizing accuracy for filling in the gaps, and minimizing processing time for filling in the gap.

4. The method of claim 1
wherein the second algorithm includes an equation Fh=g, wherein Fh=g includes a plurality of solutions, for h, wherein a solution from the plurality of solutions that is selected to fill in the gap is the solution for h, such that ||h|| is minimized solving for h=F$^+$g, wherein a pseudo-inverse of F includes F$^+$, wherein vectors h and g include:

$$h = \begin{pmatrix} r_1 \\ \vdots \\ r_n \\ c_1 \\ \vdots \\ c_m \end{pmatrix}, g = \begin{pmatrix} \sum_{j \in P_1} y_{1j} \\ \vdots \\ \sum_{j \in P_n} y_{nj} \\ \sum_{i \in Q_1} y_{i1} \\ \vdots \\ \sum_{i \in Q_m} y_{im} \end{pmatrix},$$

respectively,
wherein $$F = \begin{pmatrix} \sum_j \varepsilon_{1j} & 0 & \cdots & 0 & \varepsilon_{11} & \varepsilon_{12} & \cdots & \varepsilon_{1m} \\ 0 & \sum_j \varepsilon_{2j} & \cdots & 0 & \varepsilon_{21} & \varepsilon_{22} & \cdots & \varepsilon_{2m} \\ \vdots & \vdots & \ddots & \vdots & \vdots & \vdots & \ddots & \vdots \\ 0 & 0 & \cdots & \sum_j \varepsilon_{nj} & \varepsilon_{n1} & \varepsilon_{n2} & \cdots & \varepsilon_{nm} \\ \varepsilon_{11} & \varepsilon_{21} & \cdots & \varepsilon_{n1} & \sum_i \varepsilon_{i1} & 0 & \cdots & 0 \\ \varepsilon_{12} & \varepsilon_{22} & \cdots & \varepsilon_{n2} & 0 & \sum_i \varepsilon_{i2} & \cdots & 0 \\ \vdots & \vdots & \ddots & \vdots & \vdots & \vdots & \ddots & \vdots \\ \varepsilon_{1m} & \varepsilon_{2m} & \cdots & \varepsilon_{nm} & 0 & 0 & \cdots & \sum_i \varepsilon_{im} \end{pmatrix},$$

wherein a matrix of column differences, $c_{ij}$, includes $c_{ij}$=$w_{ij+1}$−$w_{ij}$ whenever both $w_{ij+1}$ and $w_{ij}$ are not null, and $c_{ij}$=null, otherwise, wherein a matrix of row differences, $r_{ij}$, includes $r_{ij}$=$w_{i+1j}$−$w_{ij}$ whenever both $w_{i+1j}$ and $w_{ij}$ are not null, and $r_{ij}$=null, otherwise, wherein (i, j) refers to a $j^{th}$ day of an $i^{th}$ week, for n weeks with m days in each week, wherein $x_{ij}$ includes valid numerical data, and if data is not valid on (i, j), $x_{ij}$=null, wherein $v_{ij}$ includes $v_{ij}$=$x_{ij}$, unless $x_{ij}$=0, in which case, $v_{ij}$=null, wherein $w_{ij}$ includes $w_{ij}$=ln($v_{ij}$) whenever $v_{ij}$ is not null, and $w_{ij}$=null whenever $v_{ij}$=null, wherein in the matrix F the symbol $\varepsilon_{ij}$, where $\varepsilon_{ij}$=1 when $y_{ij}$ is not null, and $\varepsilon_{ij}$=0 when $y_{ij}$ is null, wherein $$y_{ij} = \begin{cases} x_{ij} - \mu; \ (i, j) \in S \\ \text{null}; \ (i, j) \notin S \end{cases},$$

wherein $x_{ij}$ denotes entries of a logarithm matrix, X, wherein a set, S=

$$\{(i, j) \mid x_{ij} \neq \text{null}\}, \text{wherein } \mu = \frac{1}{o(S)} \sum_{(i,j) \in S} x_{ij}.$$

5. The method of claim 1, including forecasting future transaction activity utilizing the complete transaction data.

6. A machine-readable storage medium storing a sequence of instructions that, when executed by a computer, cause the computer to perform the method comprising:
  receiving incomplete transaction data;
  determining a gap in the incomplete transaction data; and
  using an algorithm to generate data to fill in the gap and to generate complete transaction data, wherein the algorithm is selected from a group including a first algorithm and a second algorithm,
  wherein the first algorithm is automatically to:
    determine a dominant pattern in the transaction data;
    identify a region within the dominant pattern that corresponds to the gap in the transaction data; and
    adopt data associated with the corresponding region in the gap to minimize impact on the dominant pattern; and
  wherein the second algorithm includes a Moore-Penrose pseudo-inverse algorithm to choose at least a portion of the transaction data to fill in the gap based on a set of substitute data from among a group of substitute data sets and to adopt the set of substitute data into the gap; and
  wherein the first algorithm includes
    (i, j) referring to a $j^{th}$ day of an $i^{th}$ week, for n weeks with m days in each week,
    wherein $x_{ij}$, includes valid numerical data, and if the data is not valid on (i, j), $x_{ij}$=null,
    wherein $v_{ij}$ includes $v_{ij}=x_{ij}$, unless $x_{ij}=0$, in which case, $v_{ij}$=null,
    wherein $w_{ij}$ includes $w_{ij}=\ln(v_{ij})$ whenever $v_{ij}$ is not null, and $w_{ij}$=null whenever $v_{ij}$=null,
    wherein a matrix of column differences, $c_{ij}$, includes $c_{ij}=-w_{ij+1-wij}$ whenever both $w_{ij+1}$ and $w_{ij}$ are not null, and $c_{ij}$=null, otherwise,
    wherein a matrix of row differences, $r_{ij}$, includes $r_{ij}=w_{i+1j}-w_{ij}$ whenever both $w_{i+1j}$ and $w_{ij}$ are not null, and $r_{ij}$=null, otherwise,
    wherein a $j^{th}$ column of $c_{ij}$ includes at least one non-null entry, and $c_{*j}$ includes an average of each non-null entry in the $j^{th}$ column of $c_{ij}$, otherwise, $c_{*j}=0$,
    wherein an $i^{th}$ row of $r_{ij}$ includes at least one non-null entry, and $r_{i*}$ includes an average of each non-null entry in the $i^{th}$ row of $r_{ij}$, otherwise, $r_{i*}=0$,
    wherein $C_{j+1}=C_j+c_{*j}$, where $C_1=0$,
    wherein $R_{i+1}=R_i+r_{i*}$, where $R_1=0$,
    wherein $u_{ij}=R_i+C_j$,
    wherein K includes an average of $w^{ij}-u_{ij}$ over each (i, j) entry where $w^{ij}$ is not null,
    wherein $y_{ij}=w_{ij}$ whenever $w_{ij}$ is not null and otherwise, $y_{ij}=K+u_{ij}$,
    wherein output $z_{ij}=\text{Round}(\exp(y_{ij}))$, wherein the output $z_{ij}$ corresponds to filling in the gap.

7. A system comprising:
  an interface to receive transaction data; and
  a transaction gap processor module configured to:
    determine a gap in the transaction data;
    determine a dominant pattern in the transaction data;
    identify a region within the dominant pattern that corresponds to the gap in the transaction data; and
    adopt data associated with the corresponding region into the gap to minimize impact on the dominant pattern wherein the transaction gap processor module incorporates an algorithm that includes a formula for output $z_{ij}=\text{Round}(\exp(y_{ij}))$, wherein the output $z_{ij}$ corresponds to filling in the gap, wherein (i, j) refers to a $j^{th}$ day of an $i^{th}$ week, for n weeks with m days in each week, wherein $y_{ij}=w_{ij}$ whenever $w_{ij}$ is not null and otherwise, $y_{ij}=K+u_{ij}$, wherein K includes an average of $w_{ij}-u_{ij}$ over each (i, j) entry where $w_{ij}$ is not null,
  wherein $C_{j+1}=C_j+c_{*j}$, where $C_1=0$, wherein $R_{i+1}=R_i+r_{i*}$, where $R_1=0$, wherein $u_{ij}=R_i+C_j$,
  wherein a matrix of column differences, $c_{ij}$, includes $c_{ij}=w_{ij=1}-w_{ij}$ whenever both $w_{ij+1}$ and $w_{ij}$ are not null, and $c_{ij}$=null, otherwise,
  wherein a matrix of row differences, $r_{ij}$, includes $r_{ij}=w_{i+1j}-w_{ij}$ whenever both $w_{i+1j}$ and $w_{ij}$ are not null, and $r_{ij}$=null, otherwise,
  wherein a $j^{th}$ column of $c_{ij}$ includes at least one non-null entry, and $c_{*j}$ includes an average of each non-null entry in the $j^{th}$ column of $c_{ij}$, otherwise, $c_{*j}=0$,
  wherein an $i^{th}$ row of $r_{ij}$ includes at least one non-null entry, and $r_{i*}$ includes an average of each non-null entry in the $i^{th}$ row of $r_{ij}$, otherwise, $r_{i*}=0$, wherein $x_{ij}$ includes valid numerical data, and if the data is not valid on (i, j), $x_{ij}$=null, wherein $v_{ij}$ includes $v_{ij}=x_{ij}$, unless $x_{ij}=0$, in which case, $v_{ij}$=null, wherein $w_{ij}$ includes $w_{ij}=\ln(v_{ij})$ whenever $v_{ij}$ is not null, and $w_{ij}$=null whenever $v_{ij}$=null.

8. A system comprising:
  an interface to receive transaction data;
  a transaction gap processor module configured to:
    determine a gap in the transaction data;
    use a Moore-Penrose pseudo-inverse algorithm to determine transaction data to fill in the gap based on a set of substitute data from among a group of substitute data sets; and
    adopt the set of substitute data into the gap;
  wherein the transaction gap module includes
  an equation Fh=g, wherein Fh=g includes a plurality of solutions, for h, wherein a solution from the plurality of solutions that is selected to fill in the gap is the solution for h, such that $\|h\|$ is minimized solving for $h=F^+g$, wherein a pseudoinverse of F includes $F^+$, wherein vectors h and g include:

$$h = \begin{pmatrix} r_1 \\ \vdots \\ r_n \\ c_1 \\ \vdots \\ c_m \end{pmatrix}, g = \begin{pmatrix} \sum_{j \in P_1} y_{1j} \\ \vdots \\ \sum_{j \in P_n} y_{nj} \\ \sum_{i \in Q_1} y_{i1} \\ \vdots \\ \sum_{i \in Q_m} y_{im} \end{pmatrix}, \text{respectively,}$$

-continued wherein $F =$ $$\begin{pmatrix} \sum_j \varepsilon_{1j} & 0 & \cdots & 0 & \varepsilon_{11} & \varepsilon_{12} & \cdots & \varepsilon_{1m} \\ 0 & \sum_j \varepsilon_{2j} & \cdots & 0 & \varepsilon_{21} & \varepsilon_{22} & \cdots & \varepsilon_{2m} \\ \vdots & \vdots & \ddots & \vdots & \vdots & \vdots & \ddots & \vdots \\ 0 & 0 & \cdots & \sum_j \varepsilon_{nj} & \varepsilon_{n1} & \varepsilon_{n2} & \cdots & \varepsilon_{nm} \\ \varepsilon_{11} & \varepsilon_{21} & \cdots & \varepsilon_{n1} & \sum_i \varepsilon_{i1} & 0 & \cdots & 0 \\ \varepsilon_{12} & \varepsilon_{22} & \cdots & \varepsilon_{n2} & 0 & \sum_i \varepsilon_{i2} & \cdots & 0 \\ \vdots & \vdots & \ddots & \vdots & \vdots & \vdots & \ddots & \vdots \\ \varepsilon_{1m} & \varepsilon_{2m} & \cdots & \varepsilon_{nm} & 0 & 0 & \cdots & \sum_i \varepsilon_{im} \end{pmatrix},$$

wherein a matrix of column differences, $c_{ij}$, includes $c_{ij}=w_{ij+1}-w_{ij}$ whenever both $w_{ij+1}$ and $w_{ij}$ are not null, and $c_{ij}$=null, otherwise, wherein a matrix of row differences, $r_{ij}$, includes $r_{ij}=w_{i+1j}-w_{ij}$ whenever both $w_{i+1j}$ and $w_{ij}$ are not null, and $r_{ij}$=null, otherwise, wherein (i, j) refers to a $j^{th}$ day of an $i^{th}$ week, for n weeks with m days in each week, wherein $x_{ij}$ includes valid numerical data, and if data is not valid on (i, j), $x_{ij}$=null, wherein $v_{ij}$ includes $v_{ij}=x_{ij}$, unless $x_{ij}=0$, in which case, $v_{ij}$=null, wherein $w_{ij}$ includes $w_{ij}=\ln(v_{ij})$ whenever $v_{ij}$ is not null, and $w_{ij}$=null whenever $v_{ij}$=null, wherein in the matrix F the symbol $\epsilon_{ij}$, where $\epsilon_{ij}=1$ when $y_{ij}$ is not null, and $\epsilon_{ij}=0$ when $y_{ij}$ is null, wherein $$y_{ij} = \begin{cases} x_{ij} - \mu; & (i,j) \in S \\ \text{null}; & (i,j) \notin S \end{cases},$$

wherein $x_{ij}$ denotes entries of a logarithm matrix, X, wherein a set, S=

$\{(i,j) \mid x_{ij} \neq \text{null}\}$, wherein $\mu = \dfrac{1}{o(S)} \displaystyle\sum_{(i,j) \in S} x_{ij}$.

9. A system of claim 8 wherein the gap includes at least one of a data error and a data omission, and the transaction data comprises data regarding frequency of transactions during periods of time.

10. A system comprising:

means for receiving transaction data;

means for determining a gap in the transaction data;

means for determining a dominant pattern in the transaction data;

means for identifying a region within the dominant pattern that corresponds to the gap in the transaction data; and means for adopting data associated with the corresponding region into the gap to minimize impact on the dominant pattern and wherein the means for determining a gap incorporates an algorithm that includes a formula for output $z_{ij}$=Round(exp($y_{ij}$)), wherein the output $z_{ij}$ corresponds to filling in the gap, wherein (i, j) refers to a $j^{th}$ day of an $i^{th}$ week, for n weeks with m days in each week, wherein $y_{ij}=w_{ij}$ whenever $w_{ij}$ is not null and otherwise, $y_{ij}=K+u_{ij}$, wherein K includes an average of $w_{ij}-u_{ij}$ over each (i, j) entry where $w_{ij}$ is not null, wherein $C_{j+1}=C_{j+c*j}$, where $C_1=0$, wherein $R_{i+1}=R_i+r_{i*}$, where $R_1=0$, wherein $u_{ij}=R_i+C_j$, wherein a matrix of column differences, $c_{ij}$, includes $c_{ij}=w_{ij+1}-w_{ij}$ whenever both $w_{ij+1}$ and $w_{ij}$ are not null, and $c_{ij}$=null, otherwise, wherein a matrix of row differences, $r_{ij}$, includes $r_{ij}=w_{i+1j}-w_{ij}$ whenever both $w_{i+1j}$ and $w_{ij}$ are not null, and $r_{ij}$=null, otherwise, wherein a $j^{th}$ column of $c_{ij}$ includes at least one non-null entry, and $c_{*j}$ includes an average of each non-null entry in the $j^{th}$ column of $c_{ij}$, otherwise, $c_{*j}=0$, wherein an $i^{th}$ row of $r_{ij}$ includes at least one non-null entry, and $r_{i*}$ includes an average of each non-null entry in the $i^{th}$ row of $r_{ij}$, otherwise, $r_{i*}=0$, wherein $x_{ij}$ includes valid numerical data, and if the data is not valid on (i, j), $x_{ij}$=null, wherein $v_{ij}$ includes $v_{ij}=x_{ij}$, unless $x_{ij}=0$, in which case, $v_{ij}$=null, wherein includes $w_{ij}=\ln(v_{ij})$ whenever $v_{ij}$ is not null, and $w_{ij}$=null whenever $v_{ij}$=null.

\* \* \* \* \*